(12) United States Patent
Hong et al.

(10) Patent No.: US 9,031,066 B2
(45) Date of Patent: May 12, 2015

(54) CASING APPARATUS HAVING WIRELESS COMMUNICATION FUNCTION FOR MOBILE TERMINAL

(71) Applicants: Renfang Hong, Huizhou (CN); Wei Ma, Huizhou (CN); Paola Pinnavaia, Huizhou (CN); Xuelong Ronald Hu, Huizhou (CN); Vittorio Dimauro, Huizhou (CN)

(72) Inventors: Renfang Hong, Huizhou (CN); Wei Ma, Huizhou (CN); Paola Pinnavaia, Huizhou (CN); Xuelong Ronald Hu, Huizhou (CN); Vittorio Dimauro, Huizhou (CN)

(73) Assignee: Huizhou TCL Mobile Communication Co., Ltd., Huizhou (CN)

( * ) Notice: Subject to any disclaimer, the term of this patent is extended or adjusted under 35 U.S.C. 154(b) by 195 days.

(21) Appl. No.: 13/879,029

(22) PCT Filed: Dec. 13, 2012

(86) PCT No.: PCT/CN2012/086478
§ 371 (c)(1),
(2) Date: Apr. 12, 2013

(87) PCT Pub. No.: WO2014/086056
PCT Pub. Date: Jun. 12, 2014

(65) Prior Publication Data
US 2014/0341197 A1     Nov. 20, 2014

(30) Foreign Application Priority Data

Dec. 3, 2012  (CN) .......................... 2012 1 0508242

(51) Int. Cl.
*H04W 88/06* (2009.01)
*H04W 88/02* (2009.01)
*H04W 84/12* (2009.01)

(52) U.S. Cl.
CPC .............. *H04W 88/06* (2013.01); *H04W 88/02* (2013.01); *H04W 84/12* (2013.01)

(58) Field of Classification Search
CPC ..... H04W 88/06; H04W 88/02; H04W 84/12; H04M 1/271; G06F 3/016
USPC ................... 370/338; 455/557, 563; 345/156; 361/679.56; 726/26
See application file for complete search history.

(56) References Cited

U.S. PATENT DOCUMENTS

| 7,782,610 B2 * | 8/2010 | Diebel et al. ............. 361/679.56 |
| 2004/0005914 A1 * | 1/2004 | Dear ............................. 455/563 |

(Continued)

*Primary Examiner* — Jung Park
*Assistant Examiner* — Chuong M Nguyen
(74) *Attorney, Agent, or Firm* — Anova Law Group, PLLC (57) ABSTRACT

The present invention relates to a casing apparatus having the wireless communication function for a mobile terminal, comprising a casing apparatus body, and an antenna, a communication PCBA, and a battery supplying power to the communication PCBA that are arranged in the casing apparatus body; the communication PCBA is integrated with a digital communication module and a WIFI communication module, and the antenna and the battery are respectively connected to the communication PCBA. The casing apparatus according to the present invention transmits a WIFI signal from a tablet computer through the antenna to the WIFI communication module for processing, then transmits the processed signal to the digital communication module for modulation, and finally radiates the modulated signal through the antenna to access a wireless communication network. In this way, the WIFI signal from the tablet computer gets to access the network, thereby realizing the wireless access to the network even though there is no WIFI hotspot available.

19 Claims, 7 Drawing Sheets

(56) References Cited

U.S. PATENT DOCUMENTS

2009/0195497 A1* 8/2009 Fitzgerald et al. ............ 345/156
2009/0252117 A1* 10/2009 Sherman et al. ............. 370/331
2010/0093401 A1* 4/2010 Moran et al. .................. 455/566
2012/0196652 A1* 8/2012 Lee et al. ...................... 455/557
2012/0266251 A1* 10/2012 Birtwhistle et al. ............ 726/26

* cited by examiner

CASING APPARATUS HAVING WIRELESS COMMUNICATION FUNCTION FOR MOBILE TERMINAL

FIELD OF THE INVENTION

The present invention relates to the field of wireless communication technologies, and in particular to a casing apparatus having the wireless communication function for a mobile terminal.

BACKGROUND OF THE INVENTION

WIFI (Wireless Fidelity), a wireless network access technology, is the most widely used wireless network transmission technology. With constant development of this technology, smart terminals capable of connecting a network through WIFI, such as tablet computers and smart phones, are becoming increasingly popular, and WIFI hotspots that enable smart terminals to access a network wirelessly are also increasing such that the smart terminals can access a network wirelessly through the WIFI hotspots. However, the wireless access of a smart terminal to the network depends on the availability of a WIFI hotspot, which cause a certain limitation. To be specific, if no WIFI is available at a place, a smart terminal cannot access the network wirelessly.

SUMMARY OF THE INVENTION

In view of the above defect in the prior art, an objective of the present invention is to provide a casing apparatus having the wireless communication function for a mobile terminal, enabling a tablet computer to access a network wirelessly even though there is no WIFI hotspot available.

To achieve the above objective, the present invention adopts the following technical solution:

A casing apparatus having a wireless communication function for a mobile terminal, comprising a casing apparatus body;

a communication PCBA, configured to receive a WIFI signal and a network signal, and process, modulate and transmit the WIFI signal and the network signal;

an antenna, configured to transmit a signal between the mobile terminal and the casing apparatus, and between the casing apparatus and a wireless communication network; and a battery, configured to supply power to the communication PCBA;

the antenna, the communication PCBA and the battery are disposed in the casing apparatus body; one end of the antenna is connected to the communication PCBA, and the other end of the antenna extends out of the casing apparatus;

the communication PCBA is integrated with a digital communication module and a WIFI communication module thereon, the digital communication module being connected to the WIFI communication module; the antenna is connected to the digital communication module and the WIFI communication module; and the battery is connected to the digital communication module and the WIFI communication module.

The casing apparatus having the wireless communication function for the mobile terminal, wherein the digital communication module supports any one or a plurality of the followings: LTE, UMTS, EVDO, TD-SCDMA, EDGE, GSM, CDMA.

The casing apparatus having the wireless communication function for the mobile terminal, further comprising a charging module and a USB interface, wherein the charging module is connected to the battery and the USB interface, and the charging module is integrated on the communication PCBA.

The casing apparatus having the wireless communication function for the mobile terminal, wherein the communication PCBA is further integrated with a SIM card slot, and the SIM card slot is connected to the digital communication module.

The casing apparatus having the wireless communication function for the mobile terminal, wherein the digital communication module includes a radio frequency front-end component, a radio frequency transceiver chip, a baseband chip, and a power management chip. The radio frequency front-end component, the radio frequency transceiver chip, and the baseband chip are respectively connected to the power management chip; and the baseband chip, the radio frequency transceiver chip, and the radio frequency front-end component are connected in turn. The baseband chip is connected to the WIFI communication module, and the radio frequency front-end component is connected to the antenna. The radio frequency front-end component is integrated at the edge area of the communication PCBA, and the shielding cover of the radio frequency front-end component, the shielding cover of the radio frequency transceiver chip, and the shielding cover of the baseband chip combine to form an integrated shielding cover.

The casing apparatus having the wireless communication function for the mobile terminal, further comprising an upper-front cover, a lower-rear cover, a hardware protection module, and a plastic cover. The hardware protection module is arranged between the upper-front cover and the lower-rear cover, and the plastic cover is arranged between the battery and the lower-rear cover. The antenna, the communication PCBA, and the battery are arranged between the upper-front cover and the plastic cover.

The casing apparatus having the wireless communication function for the mobile terminal, wherein the casing apparatus is a protective casing.

The casing apparatus having the wireless communication function for the mobile terminal, wherein the communication PCBA and the battery are arranged on the same plane.

comparing with the prior art, the casing apparatus having the wireless communication function for the mobile terminal is provided with a communication PCBA on which a digital communication module and a WIFI communication module are integrated, an antenna, and a battery, where a WIFI signal transmitted by a tablet computer is transmitted through the antenna to the WIFI communication module for processing, then the processed signal is transmitted to the digital communication module for modulation, and finally the modulated signal is radiated through the antenna to access a wireless communication network. In this way, the WIFI signal of the tablet computer gets to access the network, and the wireless access to the network can be realized even though there is no WIFI hotspot available.

DETAILED DESCRIPTION OF THE INVENTION

The present invention provides a casing apparatus having the wireless communication function for a mobile terminal. To make the objective, technical solutions, and technical effects of the present invention clearer and more definite, the following describes the present invention in detail with reference to drawings and embodiments. It should be understood that the specific embodiments described herein are used for illustration purpose only, not for limiting the present invention.

Figure 1:
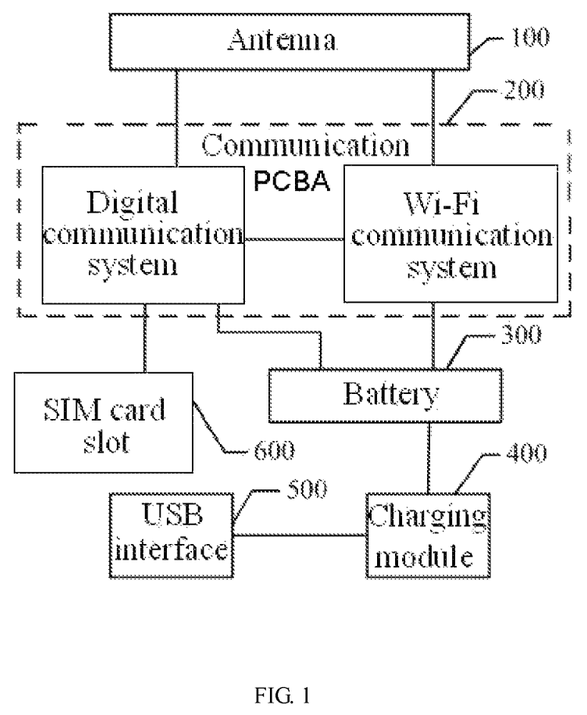
FIG. 1 is a structural block diagram of a casing apparatus having the wireless communication function for a mobile terminal according to the present invention.
Figure 2:
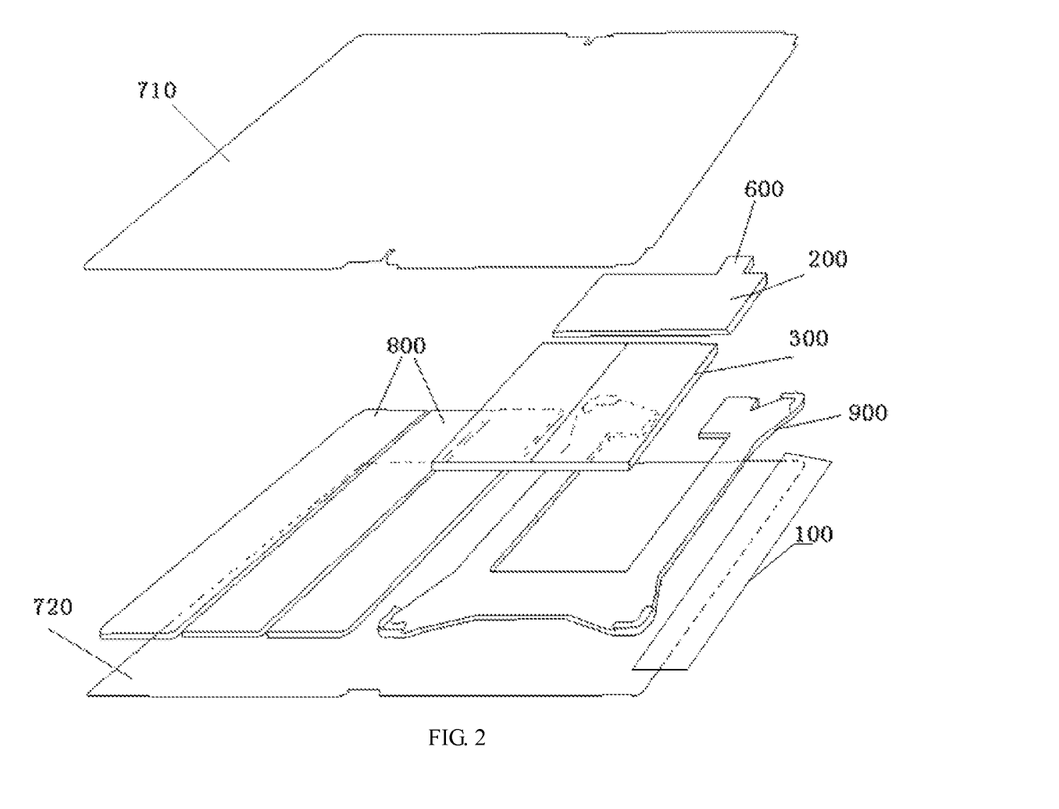
FIG. 2 is a schematic diagram of assembly of a casing apparatus having the wireless communication function for a mobile terminal according to the present invention.
Figure 3:
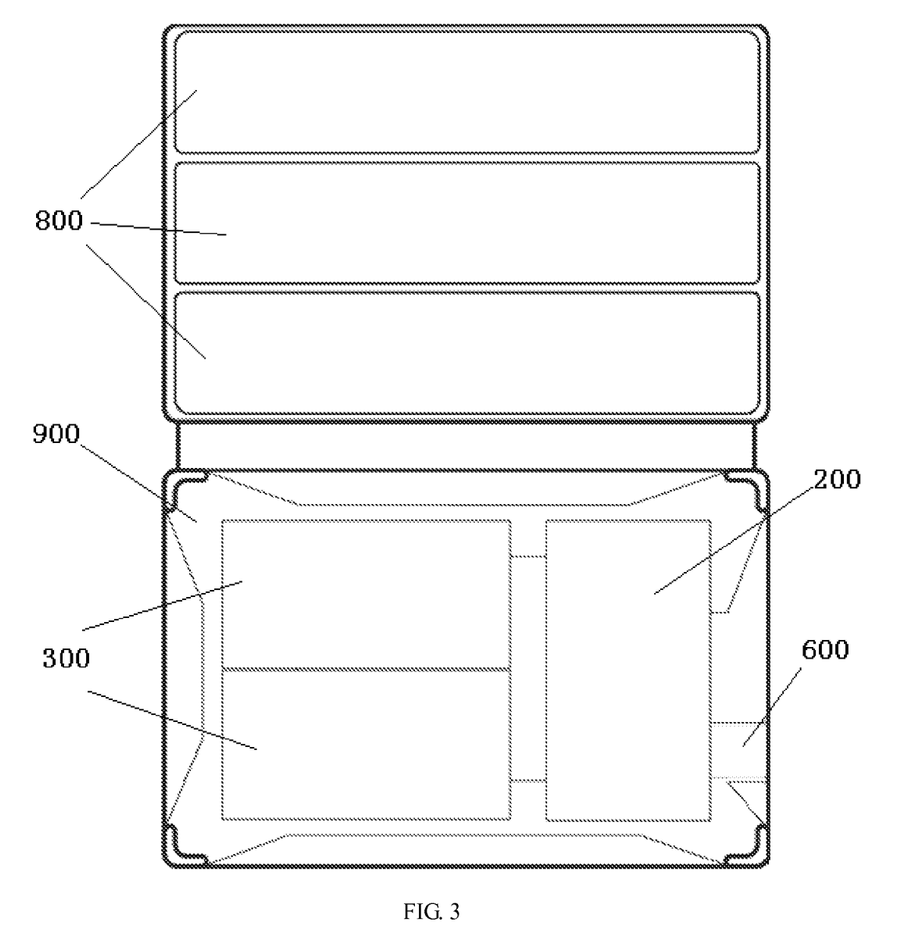
FIG. 3 is a schematic diagram of a casing apparatus having the wireless communication function for a mobile terminal without its top cover according to the present invention.
Figure 4:
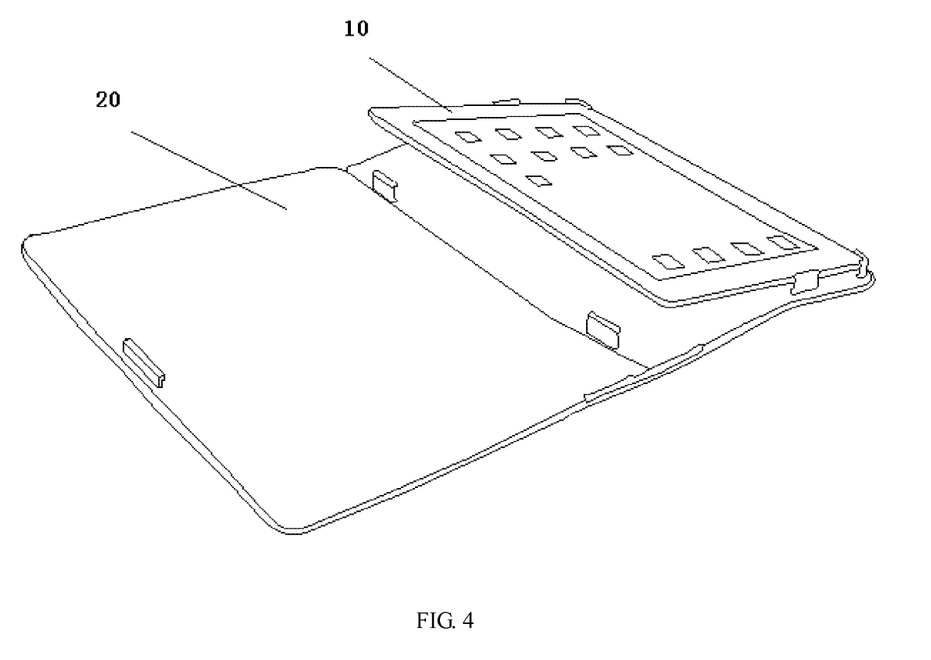
FIG. 4 is a schematic diagram of the usage of a casing apparatus having the wireless communication function for a mobile terminal according to the present invention.

The casing apparatus provided in the present invention is applicable to a mobile terminal capable of accessing a WIFI. To specify the details, a tablet computer capable of accessing a WIFI is taken as an example. Referring to both FIG. 1 and FIG. 2, the casing apparatus having the wireless communication function for a mobile terminal comprises a casing apparatus body, and an antenna 100, a communication PCBA 200, and a battery 300 for supplying power to the communication PCBA 200 that are arranged in the casing apparatus boy; the antenna 100 and the battery 300 are respectively connected to the communication PCBA 200. In this embodiment, the casing apparatus is a protective casing for housing the tablet computer, as shown in FIG. 4. The protective casing further comprises an upper-front cover 710, a lower-rear cover 720, a hardware protection module 800, and a plastic cover 900, and the assembly thereof is as shown in FIG. 2. The antenna 100, the battery 300, the communication PCBA 200, the hardware protection module 800, and the plastic cover 900 are arranged between the upper-front cover 710 and the lower-rear cover 720; the communication PCBA and the battery are arranged on the same plane; the hardware protection module 800 is arranged between the upper-front cover 710 and the lower-rear cover 720; the plastic cover 900 is arranged between the battery 300 and the lower-rear cover 720; the antenna, the communication PCBA 200, and the battery 300 are arranged between the upper-front cover 710 and the plastic cover 900. The arrangement thereof is as shown in FIG. 2. FIG. 3 (with no antenna shown) is a schematic diagram (a schematic diagram with the upper-front cover 710 being transparent) of the interior structure when the casing apparatus is assembled according to the assembly method shown in FIG. 2. FIG. 4 shows the usage of the casing apparatus 20 and a tablet computer 10.

The communication PCBA 200 is configured to receive a WIFI signal and a network signal, process and modulate the WIFI signal and the network signal, and then transmit the modulated signals. Specifically, the communication PCBA 200 receives a WIFI signal and a network signal transmitted by the tablet computer through the antenna 100, processes and modulates the received signals, and then respectively transmits the signals to the wireless communication network and the tablet computer through the antenna 100. The communication PCBA 200 is integrated with a digital communication module and a WIFI communication module. The digital communication module is equivalent to a digital communication system, and the WIFI communication module is equivalent to a WIFI communication system. The antenna is connected to the digital communication module and the WIFI communication module, the battery is connected to the digital communication module and the WIFI communication module, and the digital communication module is connected to the WIFI communication module. The communication PCBA 200 is a ordinary PCB, which is obtained by integrating a digital communication module and a WIFI communication module on a PCB. The communication PCBA 200 is further integrated with a SIM card slot 600 for inserting a SIM card, wherein the SIM card slot 600 is connected to the digital communication module. The digital communication module supports any one or a plurality of the followings: LTE (Long Term Evolution), UMTS (Universal Mobile Telecommunications System), EVDO (Evolution-Data Only), TD-SCDMA (Time Division-Synchronous Code Division Multiple Access), EDGE (Enhanced Data Rate for GSM Evolution), GSM (Global System for Mobile Communications) and CDMA (Code Division Multiple Access). The digital communication module includes a radio frequency front-end component, a radio frequency transceiver chip, a baseband chip, and a power management chip. An IQ signal from the baseband chip enters the radio frequency transceiver chip for modulation, the modulated signal is then amplified by the radio frequency front-end component, and finally the amplified signal is radiated through the antenna to the wireless communication network. The radio frequency signal received from the wireless communication network by the antenna, is then filtered by the radio frequency front-end component, then transmitted to the radio frequency transceiver chip and modulated into the IQ signal, and finally transmitted to the baseband chip for processing. The radio frequency front-end component, the radio frequency transceiver chip, and the baseband chip are respectively connected to the power management chip which can supply the power. The baseband chip, the radio frequency transceiver chip, and the radio frequency front-end component are connected in turn. The baseband chip is connected to the WIFI communication module, and the radio frequency front-end component is connected to the antenna. When the power supply is stable, the IQ signal from the baseband chip is modulated by the radio frequency transceiver chip and radiated by the antenna 100 so as to access any one or a plurality of the following communication networks: LET, UMTS, EVDO, TD-SCDMA, EDGE, GSM, and CDMA. The casing apparatus implements data information communication with the above communication networks through the digital communication module.

The WIFI communication module establishes communication with the tablet computer capable of accessing WIFI through the antenna, and transmits the WIFI signal at frequency of 2.4 GHz. In this way, data transmission between the WIFI communication module and the tablet computer is achieved, thereby establishing the wireless communication. The digital communication module supports one or a plurality of the followings: LTE, UMTS, EVDO, TD-CDMA, EDGE, GSM, and CDMA, and establishes communication with the WIFI communication module through an SDIO bus. In this embodiment, the digital communication module serves as a Host end, and the WIFI communication module serves as a Device end. Based on working principles of the SDIO bus, the digital communication module controls the WIFI communication module through the SDIO bus. In this way, the WIFI communication module and the digital communication module constitute a WIFI hotspot. The tablet computer can connect the network wirelessly through the WIFI hotspot provided by the casing apparatus at a place where no WIFI hotspot is available.

The antenna 100, serving as a carrier for the casing apparatus to implement the wireless communication function, is capable of radiating or receiving a signal, and is configured to transmit a corresponding signal between the tablet computer and the casing apparatus, and between the casing apparatus and the wireless communication network. The signal, which is transmitted by the digital communication module and the WIFI communication module, can be radiated by the antenna 100 after electromagnetic transduction; and the antenna 100 is further capable of receiving any one or a plurality of signals from LTE, UMTS, EVDO, TD-SCDMA, EDGE, GSM, and CDMA networks, and receiving a WIFI signal transmitted by the tablet computer. The battery 300 supplies power to the communication PCBA 200, that is, supplies power to the digital communication module and the WIFI communication module, which therefore ensure the two modules work normally. The battery 300 can be a Lithium battery. To avoid a large number of scrap batteries caused by replacement of the exhausted battery 300, the casing apparatus further comprises a charging module 400 and a USB interface 500 for charging the battery 300. The charging module 400 is connected to the battery 300 and the USB interface 500. The charging module 400 is integrated on the communication PCBA 200, and the USB interface is arranged at the edge of the casing apparatus. When the battery 300 fails to supply sufficient power or is exhausted, by connecting the USB interface 500 to the alternating current, the battery 300 can be charged through the charging module 400 for recovering the battery voltage to a normal voltage range, then supply necessary power for normal working to the communication PCBA 200. The battery 300 and the charging module 400 form a power system, enabling the casing apparatus to have the function of power supply and charging.

During specific implementation, the WIFI signal transmitted by the tablet computer with WIFI function is received by the antenna 100 and transmitted to the WIFI communication module in the casing apparatus for data signal processing, and the data information is then transmitted through the SDIO bus arranged in the casing apparatus to the digital communication module for modulation, and finally radiated by the antenna to access the wireless communication network. In this way, the WIFI signal from the tablet computer can access the network, thereby access to the network wirelessly. Meanwhile, the casing apparatus is capable of supporting use by a single smart terminal or by a plurality of smart terminals that can access the WIFI simultaneously.

Below two points should be paid attention to when designing the said casing apparatus: the antenna position and heat dissipation.

I. Issue of the Antenna Position

Figure 5:
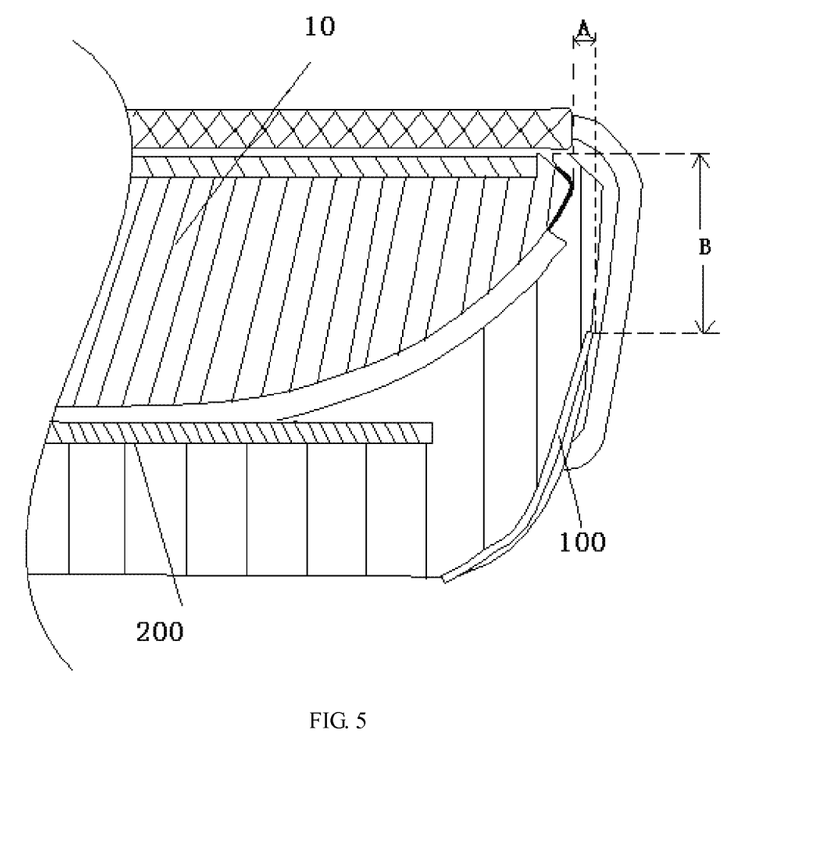
FIG. 5 is a schematic cross-sectional view of an antenna in a casing apparatus having the wireless communication function for the mobile terminal according to the first embodiment of the present invention.
Figure 7:
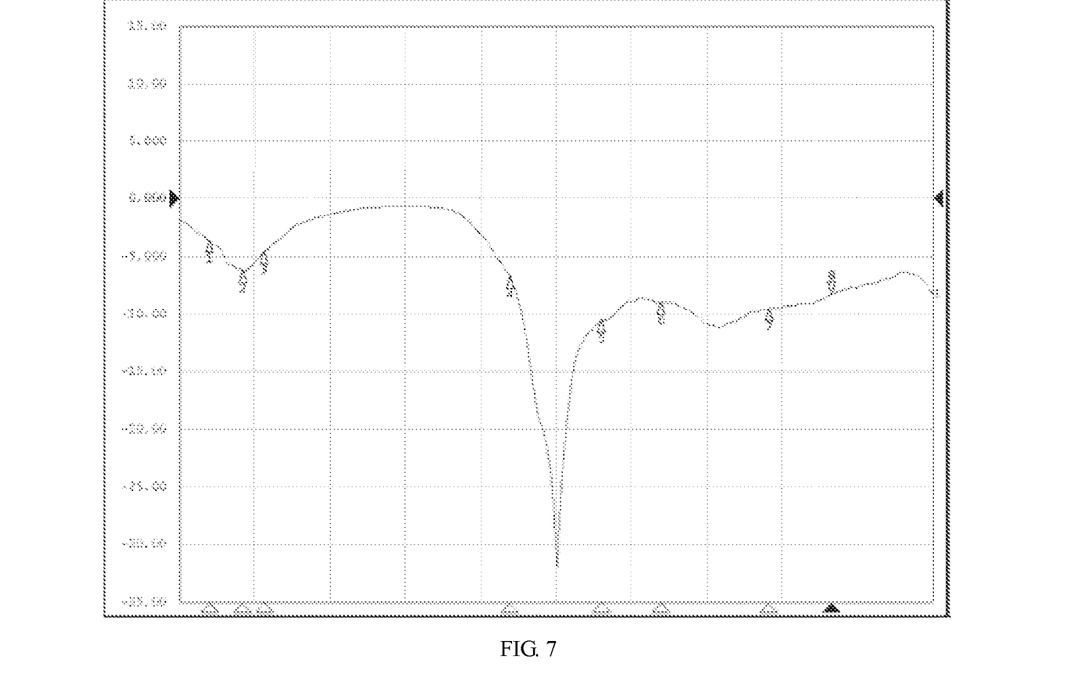
FIG. 7 is a schematic diagram of the performance of an antenna when arranged in the casing apparatus.

Currently, since the casings of most tablet computers are made of metal materials, performance of antennas will be affected, that is, data and signal transmission will be affected, which hence affect the users' experience when accessing the network. Referring to FIG. 5, it can be seen that the antenna 100 is arranged inside the casing apparatus, and the antenna is close to the metal surface of the tablet computer, with the distance in width between them is A and B in height. FIG. 7 is a schematic diagram of the antenna performance spectrum that is actually measured. In this case, the initial best low frequency of the antenna is −6 db.

Figure 6:
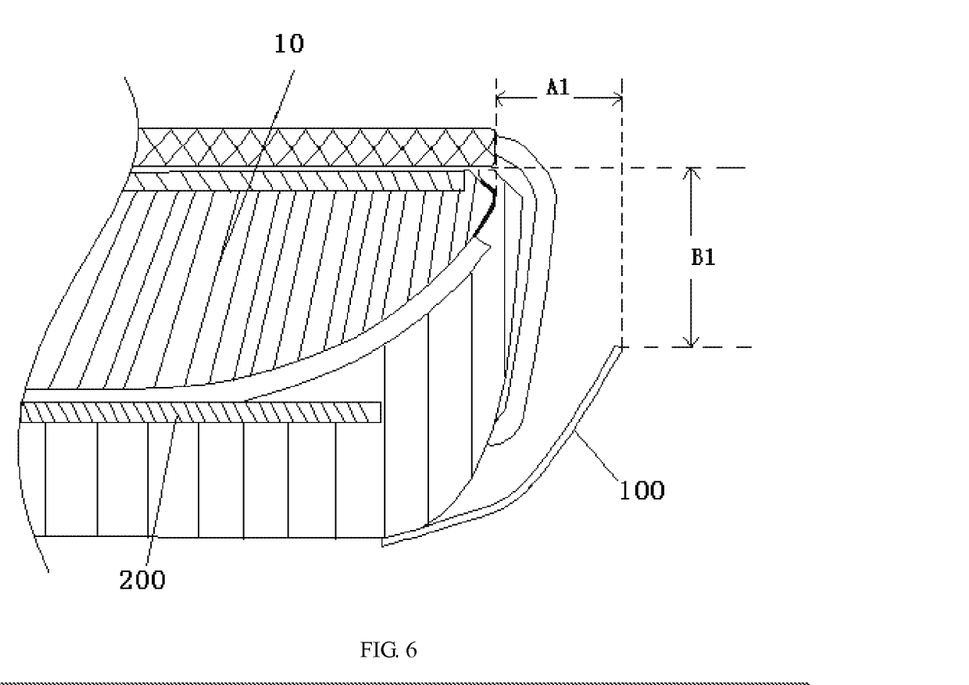
FIG. 6 is a schematic cross-sectional view of an antenna in a casing apparatus having the wireless communication function for the mobile terminal according to a preferred embodiment of the present invention.
Figure 8:
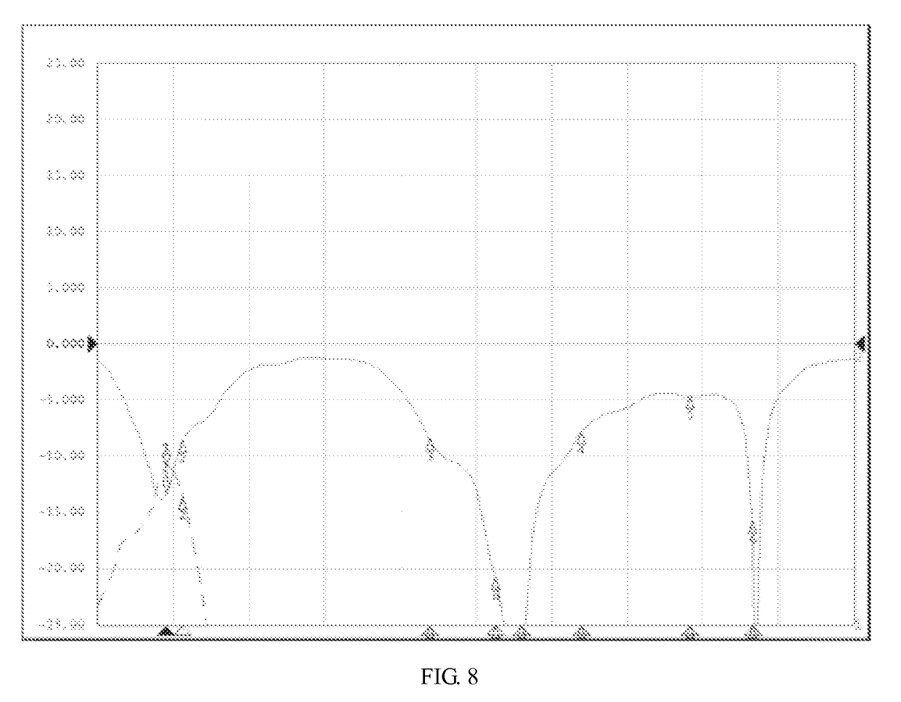
FIG. 8 is a schematic diagram of the performance of an antenna when arranged out of the casing apparatus according to the present invention.

FIG. 6 is a schematic diagram showing the position of the antenna 100 that is changed. One end of the antenna 100 is still arranged in the casing apparatus and connected to the communication PCBA, and the other end of the antenna 100 extends out of the casing apparatus so that the other end of the antenna 100 is far away from the metal surface of the tablet computer 10, thereby increasing the distance in terms of height (B1) between the antenna 100 and the metal surface of the tablet computer 10. Meanwhile, since the other end of the antenna 100 is exposed out of the casing apparatus and extends outward, the distance in terms of width (A1) is increased, such that the antenna 100 is far away from the metal surface of the tablet computer 10. FIG. 8 is a schematic diagram of the antenna performance spectrum that is actually measured. By comparing FIG. 7 and FIG. 8, it can be seen that after the position of the antenna 100 is changed, the low frequency of the antenna is improved from its initial best −6 db to the current −13 db, which thereby avoids the influence of the metal materials on the antenna performance.

II. Issue of Heat Dissipation

The digital communication module (especially the radio frequency front-end component) consumes great power. For example, in an LTE system, the great power consumption will cause the temperature to increase quickly in the LTE system, which consequently causes the communication PCBA to generate much heat. By measuring the actual temperature of the communication PCBA, it can be seen that the highest temperature reaches 101.3° C. Such a high temperature can damage the communication PCBA if it lasts for a while.

Solutions:

1. Integrate the radio frequency front-end component of the digital communication module at the edge area of the communication PCBA, and leave sufficient via at the GND pins of the radio frequency front-end component.

2. Integrate the shielding cover of the radio frequency front-end component, the shielding cover of the radio frequency transceiver chip, and the shielding cover of the baseband chip to form an integrated shielding cover, ensure that the shielding cover of the radio frequency front-end component is fully and well grounded, and avoid using an open shielding cover contact mode.

With the above solutions, the radio frequency front-end component is fully grounded, and the heat generated is thus transferred to the shielding cover of the radio frequency front-end component through the communication PCBA, and then dissipated through the shielding cover. Three separate shielding covers, i.e., the shielding cover of the radio frequency front-end component, the shielding cover of the radio frequency transceiver chip, and the shielding cover of the baseband chip, are combined to form an integrated shielding cover. Therefore, the heat generated by the radio frequency front-end component is not only dissipated through its own shielding cover, but also dissipated through the other shielding covers. It is found in actual measurement that the temperature of the communication PCBA decreases to 93.3° C., which shows that the heat dissipation is greatly enhanced.

It can be understood that persons skilled in the art can derive equivalent replacements or modifications according to the technical solutions and the inventive concept disclosed in the present invention, and such modifications or replacements shall all fall within the protection scope defined by the claims in the present invention.

What is claimed is:

1. A casing apparatus having a wireless communication function for a mobile terminal, comprising:
a casing apparatus body;
a communication PCBA configured to receive a WIFI signal and a radio frequency signal from a wireless communication network, and process, modulate and transmit the WIFI signal and the radio frequency signal;
an antenna configured to transmit a corresponding signal between the mobile terminal and the casing apparatus, and between the casing apparatus and the wireless communication network; and
a battery configured to supply power to the communication PCBA;
wherein:
the antenna, the communication PCBA and the battery are disposed in the casing apparatus body; one end of the antenna is connected to the communication PCBA, and the other end of the antenna extends out of the casing apparatus;
the communication PCBA is integrated with a digital communication module and a WIFI communication module, the digital communication module being connected to the WIFI communication module;
the antenna is connected to the digital communication module and the WIFI communication module;
the battery is connected to the digital communication module and the WIFI communication module;
the communication PCBA is further integrated with a SIM card slot, and the SIM card slot is connected to the digital communication module;
the digital communication module transmits the radio frequency signal, establishes communication with the WIFI communication module through an Secure Digital Input/Output (SDIO) bus, and serves as a host end;
the WIFI communication module serves as a device end and is controlled by the digital communication module through the SDIO bus;
the digital communication module and the WIFI communication module constitute a WIFI hotspot; and
the mobile terminal connects to the wireless communication network wirelessly through the WIFI hotspot provided by the casing apparatus.

2. The casing apparatus having a wireless communication function for a mobile terminal according to claim 1, wherein the digital communication module supports any one or a plurality of the followings: LTE, UMTS, EVDO, TD-SCDMA, EDGE, GSM, CDMA.

3. The casing apparatus having a wireless communication function for a mobile terminal according to claim 2, wherein, the digital communication module comprises a radio frequency front-end component, a radio frequency transceiver chip, a baseband chip, and a power management chip;
the radio frequency front-end component, the radio frequency transceiver chip, and the baseband chip are respectively connected to the power management chip, and
the baseband chip, the radio frequency transceiver chip, the radio frequency front-end component are connected in turn;
the baseband chip is connected to the WIFI communication module,
the radio frequency front-end component is connected to the antenna;
the radio frequency front-end component is integrated at an edge area of the communication PCBA,
a shielding cover of the radio frequency front-end component, a shielding cover of the radio frequency transceiver chip, and a shielding cover of the baseband chip are combined to form an integrated shielding cover to facilitate heat dissipation.

4. The casing apparatus having a wireless communication function for a mobile terminal according to claim 1, wherein, further comprising:
a charging module and a USB interface,
the charging module is connected to the battery and the USB interface, and
the charging module is integrated on the communication PCBA.

5. The casing apparatus having a wireless communication function for a mobile terminal according to claim 1, wherein further comprising:
an upper-front cover, a lower-rear cover, a hardware protection module, and a plastic cover; the hardware protection module is arranged between the upper-front cover and the lower-rear cover;
the plastic cover is arranged between the battery and the lower-rear cover;
the antenna, the communication PCBA, and the battery are arranged between the upper-front cover and the plastic cover.

6. The casing apparatus having a wireless communication function for a mobile terminal according to claim 1, wherein the casing apparatus is a protective casing.

7. The casing apparatus having a wireless communication function for a mobile terminal according to claim 1, wherein the communication PCBA and the battery are arranged on a same plane.

8. A casing apparatus having a wireless communication function for a mobile terminal, comprising:
a casing apparatus body;
a communication PCBA configured to receive a WIFI signal and a radio frequency signal from a wireless communication network, and process, modulate and transmit the WIFI signal and the network signal;
an antenna configured to transmit a corresponding signal between the mobile terminal and the casing apparatus, and between the casing apparatus and the wireless communication network; and
a battery configured to supply power to the communication PCBA;
wherein:
the antenna, the communication PCBA and the battery are disposed in the casing apparatus body; one end of the antenna is connected to the communication PCBA, and the other end of the antenna extends out of the casing apparatus;
the communication PCBA is integrated with a digital communication module and a WIFI communication module, the digital communication module being connected to the WIFI communication module;
the antenna is connected to the digital communication module and the WIFI communication module;
the battery is connected to the digital communication module and the WIFI communication module;
the digital communication module transmits the radio frequency signal, establishes communication with the WIFI communication module through an Secure Digital Input/Output (SDIO) bus, and serves as a host end;
the WIFI communication module serves as a device end and is controlled by the digital communication module through the SDIO bus;

the digital communication module and the WIFI communication module constitute a WIFI hotspot; and
the mobile terminal connects to the wireless communication network wirelessly through the WIFI hotspot provided by the casing apparatus.

9. The casing apparatus having a wireless communication function for a mobile terminal according to claim 8, wherein the digital communication module supports any one or a plurality of the followings: LTE, UMTS, EVDO, TD-SCDMA, EDGE, GSM, CDMA.

10. The casing apparatus having a wireless communication function for a mobile terminal according to claim 9, wherein, the digital communication module comprises a radio frequency front-end component, a radio frequency transceiver chip, a baseband chip, and a power management chip;
the radio frequency front-end component, the radio frequency transceiver chip, and the baseband chip are respectively connected to the power management chip, and
the baseband chip, the radio frequency transceiver chip, the radio frequency front-end component are connected in turn;
the baseband chip is connected to the WIFI communication module,
the radio frequency front-end component is connected to the antenna;
the radio frequency front-end component is integrated at an edge area of the communication PCBA,
a shielding cover of the radio frequency front-end component, a shielding cover of the radio frequency transceiver chip, and a shielding cover of the baseband chip are combined to form an integrated shielding cover to facilitate heat dissipation.

11. The casing apparatus having a wireless communication function for a mobile terminal according to claim 8, wherein, further comprising:
a charging module and a USB interface,
the charging module is connected to the battery and the USB interface, and
the charging module is integrated on the communication PCBA.

12. The casing apparatus having a wireless communication function for a mobile terminal according to claim 11, wherein further comprising:
an upper-front cover, a lower-rear cover, a hardware protection module, and a plastic cover; the hardware protection module is arranged between the upper-front cover and the lower-rear cover;
the plastic cover is arranged between the battery and the lower-rear cover;
the antenna, the communication PCBA, and the battery are arranged between the upper-front cover and the plastic cover.

13. The casing apparatus having a wireless communication function for a mobile terminal according to claim 8, wherein further comprising:
an upper-front cover, a lower-rear cover, a hardware protection module, and a plastic cover; the hardware protection module is arranged between the upper-front cover and the lower-rear cover;
the plastic cover is arranged between the battery and the lower-rear cover;
the antenna, the communication PCBA, and the battery are arranged between the upper-front cover and the plastic cover.

14. The casing apparatus having a wireless communication function for a mobile terminal according to claim 8, wherein the casing apparatus is a protective casing.

15. The casing apparatus having a wireless communication function for a mobile terminal according to claim 8, wherein the communication PCBA and the battery are arranged on a same plane.

16. The casing apparatus having a wireless communication function for a mobile terminal according to claim 3, wherein:
an IQ (in-phase and quadrature components) signal from the baseband chip enters the radio frequency transceiver chip to produce a modulated signal,
the modulated signal is amplified by the radio frequency front-end component to produce an amplified signal,
the amplified signal is radiated through the antenna to the wireless communication network;
the antenna receives the radio frequency signal from the wireless communication network, and
the radio frequency signal is filtered by the radio frequency front-end component, transmitted to the radio frequency transceiver chip and modulated into the IQ signal, and transmitted to the baseband chip for processing.

17. The casing apparatus having a wireless communication function for a mobile terminal according to claim 1, wherein:
the WIFI signal is transmitted by the mobile terminal and received by the antenna;
the antenna transmits the WIFI signal to the WIFI communication module in the casing apparatus for data signal processing, extracting a data information;
the data information is transmitted through the SDIO bus to the digital communication module for modulation, and radiated by the antenna to access the wireless communication network.

18. The casing apparatus having a wireless communication function for a mobile terminal according to claim 11, wherein:
an IQ (in-phase and quadrature components) signal from the baseband chip enters the radio frequency transceiver chip to produce a modulated signal,
the modulated signal is amplified by the radio frequency front-end component to produce an amplified signal,
the amplified signal is radiated through the antenna to the wireless communication network;
the antenna receives the radio frequency signal from the wireless communication network, and
the radio frequency signal is filtered by the radio frequency front-end component, transmitted to the radio frequency transceiver chip and modulated into the IQ signal, and transmitted to the baseband chip for processing.

19. The casing apparatus having a wireless communication function for a mobile terminal according to claim 8, wherein:
the WIFI signal is transmitted by the mobile terminal and received by the antenna;
the antenna transmits the WIFI signal to the WIFI communication module in the casing apparatus for data signal processing, extracting a data information;
the data information is transmitted through the SDIO bus to the digital communication module for modulation, and radiated by the antenna to access the wireless communication network.

* * * * *